(12) United States Patent
Tuma (10) Patent No.: US 12,553,559 B2
(45) Date of Patent: Feb. 17, 2026

(54) COOLANT-COLLECTING DEVICE

(71) Applicant: Siemens Mobility GmbH, Munich (DE)

(72) Inventor: Claus Tuma, Lauf/Peg. (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/879,902

(22) PCT Filed: Jun. 22, 2023

(86) PCT No.: PCT/EP2023/066927
§ 371 (c)(1),
(2) Date: Dec. 30, 2024

(87) PCT Pub. No.: WO2024/002845
PCT Pub. Date: Jan. 4, 2024

(65) Prior Publication Data
US 2025/0257836 A1  Aug. 14, 2025

(30) Foreign Application Priority Data

Jun. 28, 2022 (DE) .................... 10 2022 206 472.0

(51) Int. Cl.
| | | |
|---|---|---|
| *H01M 10/6556* | (2014.01) | |
| *F16L 33/025* | (2006.01) | |
| *F16L 41/02* | (2006.01) | |
| *H01M 10/6568* | (2014.01) | |

(52) U.S. Cl.
CPC .......... *F16L 41/021* (2013.01); *F16L 33/025* (2013.01); *H01M 10/6556* (2015.04); *H01M 10/6568* (2015.04)

(58) Field of Classification Search
CPC . F16L 41/021; F16L 33/025; H01M 10/6556; H01M 10/6568
See application file for complete search history.

(56) References Cited

U.S. PATENT DOCUMENTS

| | | | |
|---|---|---|---|
| 2017/0138250 A1* | 5/2017 | Tseng ................... | B67D 7/0288 |
| 2021/0253145 A1* | 8/2021 | Levi ........................ | B61G 5/10 |

FOREIGN PATENT DOCUMENTS

| | | | | |
|---|---|---|---|---|
| CN | 202756817 U | | 2/2013 | |
| CN | 106945506 A | * | 7/2017 | ............ F16L 41/021 |
| DE | 10130194 A1 | | 1/2003 | |
| DE | 102012216540 A1 | * | 3/2014 | .............. F16L 41/12 |
| DE | 102014005962 A1 | | 10/2015 | |
| DE | 102018216047 A1 | | 3/2020 | |
| EP | 0276275 B1 | | 3/1990 | |
| EP | 2615399 A2 | | 7/2013 | |
| FR | 3080166 A1 | * | 10/2019 | .............. F28F 9/264 |
| WO | 2010094787 A1 | | 8/2010 | |

* cited by examiner

*Primary Examiner* — Muhammad S Siddiquee
(74) *Attorney, Agent, or Firm* — Laurence A. Greenberg; Werner H. Stemer; Ralph E. Locher (57) ABSTRACT

A coolant-collecting device in a battery coolant distribution system for a vehicle has at least two flexible coolant-collecting tubes and a T-shaped connecting piece with three tubular connecting elements. The T-shaped connecting piece is arranged between the flexible coolant-collecting tubes, and a first of the three tubular connecting elements can be accommodated in a coolant channel of a battery cooling profile. There is also described a method for producing a coolant-collecting device in a battery coolant distribution system and a vehicle with a battery and a battery coolant distribution system.

11 Claims, 5 Drawing Sheets

COOLANT-COLLECTING DEVICE

FIELD AND BACKGROUND OF THE INVENTION

The invention relates to a coolant-collecting device. The invention also relates to a battery coolant distribution system for a vehicle. Additionally, the invention relates to a method for producing a coolant-collecting device. In addition, the invention relates to a method for producing a battery coolant distribution system. Furthermore, the invention relates to a vehicle.

For environmental policy reasons, electric vehicles are heavily promoted and fostered. Electric vehicles have, as an energy source, extensive battery packs which comprise a multiplicity of battery cells. The battery cells generate a large amount of waste heat during operation. In addition, the temperature of the battery cells must be kept in a predefined temperature range in order to function correctly and to not become damaged or even destroyed. To cool the battery cells, for example cooling profiles made of aluminum are used for cooling. These cooling profiles run between the upper end and the lower end of a battery pack past the individual battery cells, comprise coolant channels running in the vertical direction, i.e. between the upper end and the lower end of the cooling profiles, and are connected, by flexible hoses, to coolant-collecting channels running horizontally or perpendicularly to the cooling profiles. These flexible hoses used to connect the coolant-collecting channels to the coolant channels of the cooling profiles have, as connection elements, for example suitable fittings or connection screw couplers. These connection screw couplers are individually screwed into the corresponding cooling profile and into the associated coolant-collecting channel.

The ends of the coolant-collecting channels are connected to feed hoses or feed lines and discharge hoses or discharge lines, which lead the coolant from a cooler system to the battery packet and which remove the heated coolant from the battery packet and feed it to the cooler system, respectively.

However, the installation of the individual connection elements requires much manual work, because each individual connection element must be screwed on. Also, the connections to the cooling profile and to the cooling collecting tube must be sufficiently sealed. For this purpose, four sealing elements, such as o-rings, must be installed for each flexible hose. Another problem is that the cooling profiles have tolerances of approximately 1.5 mm, which must be taken into account in the installation of the connection elements.

SUMMARY OF THE INVENTION

Thus, there exists the object of providing a reliable connection between the coolant feed or coolant discharge and the coolant channels of the cooling profiles of a battery coolant distribution system, said connection being robust in the face of tolerances and requiring less assembly work than a conventional arrangement.

This object is achieved by a coolant-collecting device as claimed, a battery coolant distribution system as claimed, a method for producing a coolant-collecting device as claimed, a method for producing a battery coolant distribution system as claimed, and a vehicle as claimed.

The coolant-collecting device according to the invention comprises at least two flexible coolant-collecting tubes and at least one T-shaped connecting piece having three tubular connecting elements. Because of their flexibility, the flexible coolant-collecting tubes allow adaptation to the tolerances of approximately 1.5 mm which are typical in the arrangement of battery cooling profiles. The at least one T-shaped connecting piece is arranged between the flexible coolant-collecting tubes and is connected liquid-tight to the flexible coolant-collecting tubes. A first of the three tubular connecting elements, which is oriented perpendicularly to the other tubular connecting elements of the at least one T-shaped connecting piece, is designed to be received in a coolant channel of a battery cooling profile. The two flexible coolant-collecting tubes have a cross section compatible with a cross section of two opposite second and third tubular connecting elements of the three tubular connecting elements, so that they can be sealingly connected to the at least one T-shaped connecting piece by placement onto or insertion into the second and third tubular connecting elements. Preferably, the inner cross section of the flexible coolant-collecting tubes corresponds to the outer cross-section of the tubular connecting elements of the at least one T-shaped connecting piece so that the flexible coolant-collecting tubes can be fitted or placed onto the tubular connecting elements.

Advantageously, the assembly effort during construction can be greatly reduced in comparison with conventional coolant-collecting devices. The otherwise common solid coolant-collecting tube or the otherwise common solid or rigid coolant-collecting channel can be dispensed with. The flexible coolant-collecting tubes can, instead, be directly connected to a feed hose or discharge hose, each of which is connected to a cooler system. Advantageously, the combination of the flexible coolant-collecting tubes and the T-shaped connecting piece can replace a difficult-to-assemble conventional arrangement of flexible hoses and connection elements, in particular suitable fittings or connection screw couplers, and a rigid coolant-collecting channel with a multiplicity of sealing points.

The battery coolant distribution system according to the invention for a vehicle comprises a battery cooling profile, which has a coolant channel running therein, and a coolant-collecting device according to the invention. The battery cooling profile is located spatially directly at the battery cells of the vehicle. The cooling liquid flowing through the coolant channel running therein removes the heat generated by the battery cells or also ambient heat. It is mentioned that a battery cooling profile usually comprises a plurality of coolant channels arranged mutually parallel and that the singular has been used in connection with the coolant channel only for the sake of simplicity. Because of the smaller number of parts for a connection between the coolant channel and a feed hose or discharge hose of a cooler system, the battery coolant distribution system according to the invention advantageously can be constructed considerably more easily than a conventional battery coolant distribution system. In addition, the flexible coolant-collecting tubes of the coolant-collecting device according to the invention allow the connection between the coolant channel or the coolant channels of the cooling profile and a feed hose or discharge hose to be easily adapted to tolerances with respect to the positioning of the coolant channels of the cooling profile.

The first tubular connecting element of the three tubular connecting elements of the T-shaped connecting piece of the coolant-collecting device is preferably inserted into the coolant channel of the battery cooling profile of the battery coolant distribution system according to the invention. Advantageously, no multi-part connecting elements are required to connect the T-shaped connecting piece to the battery cooling profile, because the first tubular connecting element is introduced or inserted directly into an associated coolant channel of the battery cooling profile.

In the method according to the invention for producing a coolant-collecting device, at least one T-shaped connecting piece having three tubular connecting elements is formed, with a first of the three tubular connecting elements, which is oriented perpendicularly to the other tubular connecting elements, for receiving in a coolant channel of a battery cooling profile. Figuratively speaking, the first tubular connecting element forms the vertical bar of the T formed by the T-shaped connecting piece and the second and third tubular connecting elements jointly form the horizontal bar of the T formed by the T-shaped connecting piece.

At least two flexible coolant-collecting tubes having a cross section compatible with a cross section of two opposite second and third connecting elements of the three tubular connecting elements are formed.

The at least one T-shaped connecting piece is finally arranged between the flexible coolant-collecting tubes and the second and third connecting elements of the T-shaped connecting piece are connected to the flexible coolant-collecting tubes. The method according to the invention shares the advantages of simplified assembly or simplified putting together which are mentioned in connection with the coolant-collecting device according to the invention.

In the method according to the invention for producing a battery coolant distribution system, the method according to the invention for producing a coolant-collecting device is carried out. In addition, the first of the three tubular connecting elements of the T-shaped connecting piece is inserted into a coolant channel of a battery cooling profile. The first tubular connecting element has an outer diameter matched to the inner diameter of the coolant channel. As explained in detail below, an additional sealing element can also be placed between the inner surface of the coolant channel and the outer surface of the first tubular connecting element in order to prevent cooling liquid or liquid coolant from escaping at the connection point or contact surface between these two assemblies. The method according to the invention for producing a battery coolant distribution system shares the advantages of the battery coolant distribution system according to the invention.

The vehicle according to the invention, preferably an electric vehicle, particularly preferably an electrically operated rail vehicle or an electrically operated industrial truck, comprises an electric battery having a battery coolant distribution system having the coolant-collecting device according to the invention. The vehicle according to the invention preferably also comprises the battery coolant distribution system according to the invention. An industrial truck, in particular a forklift, includes mobile conveying means that are used on flat surfaces. The vehicle according to the invention shares the advantages of the coolant-collecting device according to the invention and, if applicable, the advantages of the battery coolant distribution system according to the invention.

The dependent claims and the description below contain particularly advantageous embodiments and developments of the invention. In particular, the claims of one claim category can also be developed similarly to the dependent claims of another claim category and their parts of the description. In addition, in the context of the invention the various features of different exemplary embodiments and claims can also be combined to form new exemplary embodiments.

The coolant-collecting device according to the invention preferably comprises a sealing element for sealing between the first tubular connecting element and the coolant channel. Such a sealing element prevents coolant from flowing out via tolerance-caused holes or intermediate spaces which are caused e.g. by different dimensions, unevenness, in particular scores in the surface of the first tubular connecting element or of the coolant channel, in the contact region between the first tubular connecting element and the coolant channel.

The sealing element of the coolant-collecting device according to the invention particularly preferably comprises an o-ring. Advantageously, tolerances between the first tubular connecting element and the coolant channel can be compensated by the sealing element and the intermediate space arising due to the tolerances can be sealed, so that liquid is prevented from escaping at the connection point between the T-shaped connecting piece and the battery cooling profile.

Also preferably, the T-shaped connecting piece comprises a fastening unit for fastening to the battery cooling profile. The T-shaped connecting piece is fastened preferably to a so-called cooling profile plate or cooling profile cover which is fixedly, preferably integrally connected to the cooling profile. The cooling profile plate provides a flat contact surface on which the coolant-collecting device according to the invention and in particular the T-shaped connecting piece can be positioned and fastened. Advantageously, detachment of the coolant-collecting device from the battery cooling profile, for example as a result of vibrations or external mechanical force, can be avoided because of the fastening.

The fastening unit preferably has a screw point for screwing to the battery cooling profile. Advantageously, the T-shaped connecting piece can be installed on or removed from the cooling profile plate by means of a simple screwing motion and, at the same time, reliable fastening of the T-shaped connecting piece to the cooling profile plate can be achieved.

The flexible coolant-collecting tubes of the coolant-collecting device according to the invention are preferably fastened to the T-shaped connecting piece by means of a releasable fastening unit, particularly preferably by means of a tube clamp, also referred to as a screw clamp or crimp clamp. Such a tube clamp surrounds the entire periphery of a flexible coolant tube and fixedly clamps the flexible coolant-collecting tube on the T-shaped connecting piece. Advantageously, the tube clamp allows the flexible coolant-collecting tubes to be easily fastened to the T-shaped connecting piece in a desired or adjusted position relative thereto or released therefrom. Because the individual components can be easily detached by the removal of a tube clamp, maintenance work or repair work can be performed on the coolant-collecting device according to the invention very easily. In addition, it is also easy to remove the flexible coolant-collecting tubes and/or the T-shaped connecting pieces on one cooling profile of a vehicle battery and to reinstall them on another coolant-collecting device or on another vehicle battery.

The flexible coolant-collecting tubes preferably have a flexible material which is resistant to common coolants. Such a material preferably comprises one of the following types of material:

polyethylene,
polytetrafluoroethylene (PTFE),
perfluoroethylene propylene (FEP).

The mentioned types of material are resistant in particular to glycol-water mixtures, which are used as cooling liquid.

It should be explicitly mentioned again here that, in a typical vehicle battery, a plurality of cooling profiles are arranged next to one another and therefore the coolant-collecting device according to the invention preferably also comprises a plurality of the T-shaped connecting pieces and at least three flexible coolant-collecting tubes. The flexible coolant-collecting tubes are connected to one another in series by the plurality of T-shaped connecting pieces. They form a kind of chain, wherein the T-shaped connecting pieces each connect two flexible coolant-collecting tubes and are inserted into the coolant channels of the cooling profile units arranged next to one another. The flexible coolant-collecting tubes can be connected to the T-shaped connecting pieces by means of releasable fastening units, preferably tube clamps, in such a way that the distances between adjacent T-shaped connecting pieces correspond to or are consistent with the distances of the coolant channels of adjacent cooling profile units.

Figuratively speaking, the flexible coolant-collecting tubes can be pushed onto the second and third tubular connecting elements of the T-shaped connecting pieces in the longitudinal direction or axial direction until the distances between the T-shaped connecting pieces are consistent with the possibly slightly differing distances of the coolant channels of adjacent cooling profile units. Advantageously, assembly of the coolant-collecting device according to the invention in the event of tolerances of the distances between the coolant channels is greatly simplified.

The battery coolant distribution system according to the invention preferably comprises a connection line to a cooler system, the connection line being connected directly to an outer of the flexible coolant-collecting tubes. The term "cooler system" should be understood to mean a technical system that cools a cooling liquid to a predefined reduced temperature and maintains a coolant circuit. For this purpose, a cooler system comprises a heat exchanger and also a coolant pump, by means of which the coolant used is pumped through the coolant circuit.

The connection line preferably comprises a feed hose or a feed line and a discharge hose or a discharge line, which lead cooled coolant from the cooler system to the battery coolant distribution system according to the invention and remove heated coolant from the battery coolant distribution system according to the invention and feed it to the cooler system, respectively. A direct connection should be understood to be a single connecting element or connecting piece in contrast to the conventional arrangement of flexible hoses and in each case a connection element, such as a suitable fitting and/or a suitable connection screw coupler.

Advantageously, the direct connection makes it possible to avoid a difficult-to-assemble conventional arrangement of a plurality of connection elements and a hose and a rigid coolant-collecting channel with a multiplicity of sealing points.

The direct connection is preferably formed by a quick coupling between the outer flexible coolant-collecting tube and the connection line. Advantageously, the simple and quick operability of the quick coupling allows individual components, in particular parts of the coolant-collecting device according to the invention, but also the mentioned connection line, to be easily replaced.

The invention is explained again in more detail below on the basis of exemplary embodiments, with reference to the enclosed figures, in which:

DETAILED DESCRIPTION OF THE INVENTION

Figure 1:
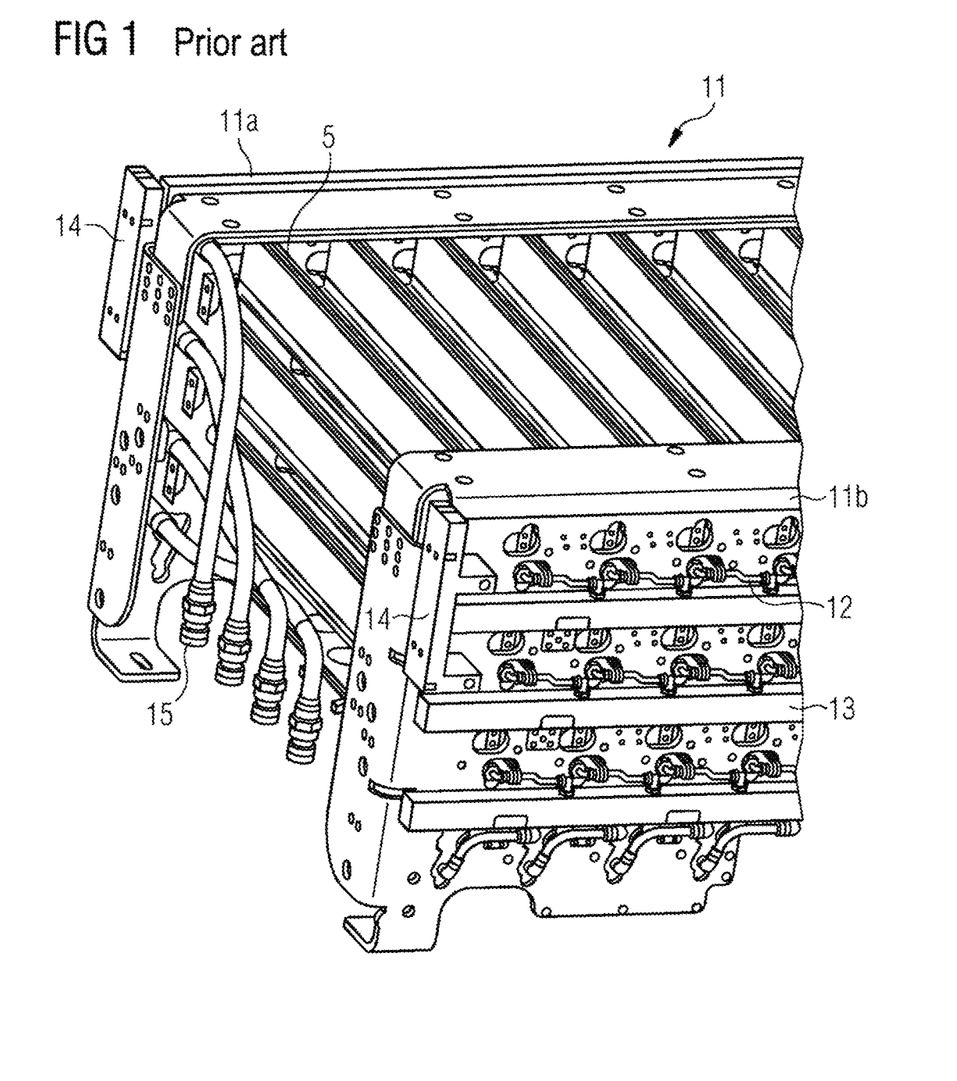
FIG. 1 shows a perspective view of an electric vehicle battery having a conventional battery coolant distribution system.

FIG. 1 shows a perspective view of an electric vehicle battery having a conventional battery coolant distribution system. The actual battery cells are omitted to improve the visibility of the structures required for cooling these battery cells. The vehicle battery 11 comprises, as end faces, a base face 11a and a head face 11b; in FIG. 1, the head face 11b can be seen in the foreground. Between the base face 11a and the head face 11b, a so-called battery cooling profile 5 runs, each of which comprises a coolant channel (not visible in FIG. 1) in the interior. The coolant channel is connected, at each end face, to a coolant-collecting channel 13 running on the respective end face by means of a hose-type connecting unit 12. The coolant-collecting channel 13 leads, at the side, into an interface or port structure 14 to a feed hose or connection hose or discharge hose 15.

Figure 2:
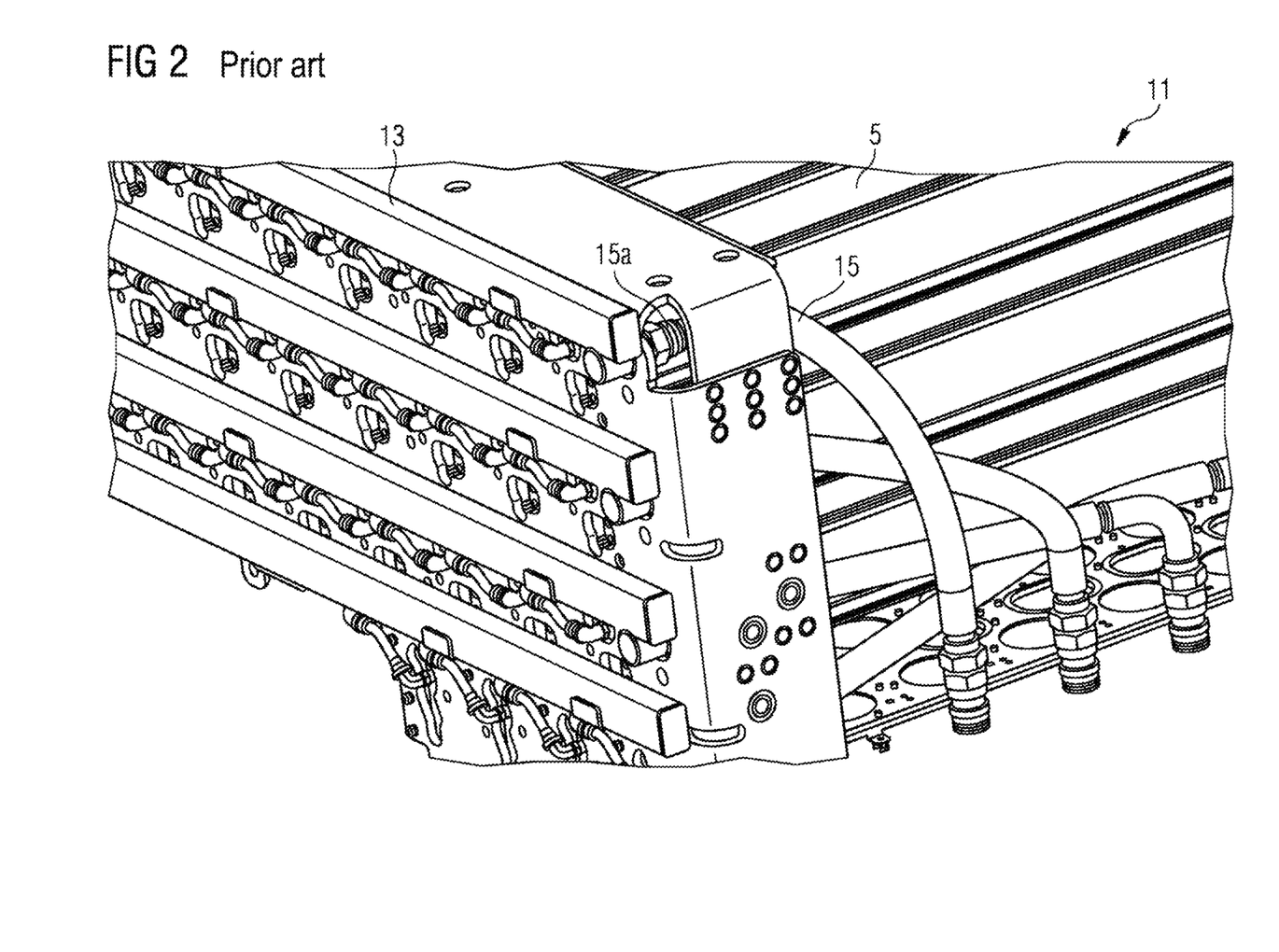
FIG. 2 shows a perspective view of the conventional battery coolant distribution system shown in FIG. 1, with a partially opened cooling profile cover.

FIG. 2 shows a perspective view of the conventional battery coolant distribution system shown in FIG. 1, with a partially opened end face. Through the opening shown in that corner of the end face which is located in the foreground, a connection means 15a of a feed hose 15 can be seen. This connection means 15a is connected to a coolant-collecting channel 13 running perpendicularly to the connection means. The coolant-collecting channels 13 run mutually parallel on the end face and form the interface between the feed hoses 15 and the battery cooling profiles 5.

Figure 3:
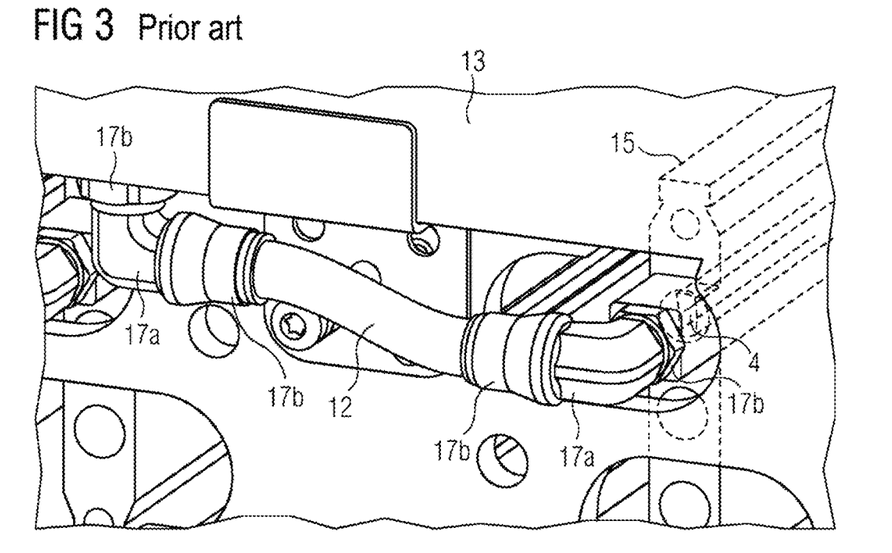
FIG. 3 shows a detail view of a flexible hose for connecting a coolant-collecting channel to a coolant channel of a battery cooling profile.

FIG. 3 shows a detail view of a flexible hose or a hose-type connecting unit 12 for connecting a coolant-collecting channel 13 to a coolant channel 4 (drawn dashed) of a battery cooling profile 5. The coolant channel 4 is located in the interior of a battery cooling profile 5 and runs perpendicularly to the associated coolant-collecting channel 13. As already mentioned, for example suitable fittings 17a or connection screw couplers 17b are needed for the connection between the coolant-collecting channel 13 and the coolant channel 4. The connection screw couplers 17b are individually screwed into the corresponding cooling profile 5 and into the associated coolant-collecting channel 13.

Figure 4:
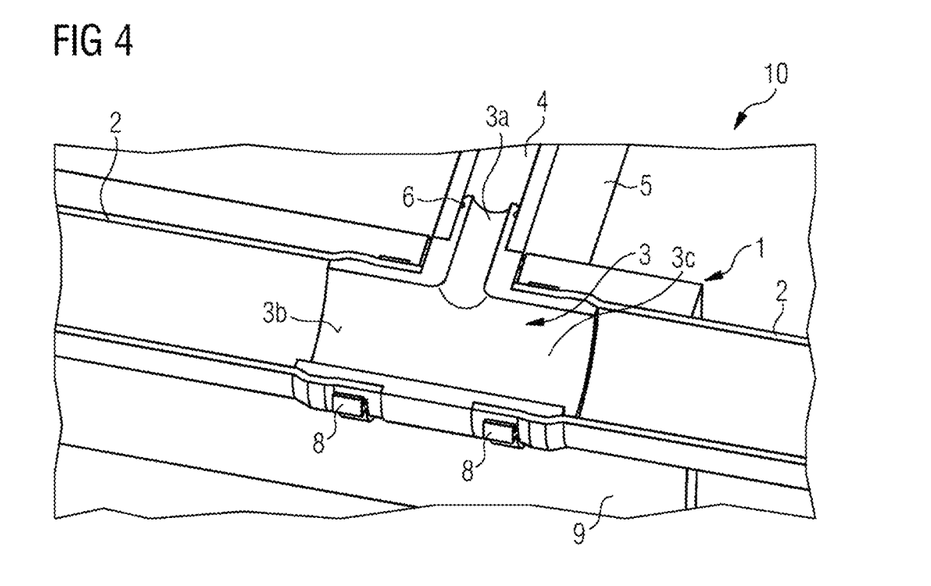
FIG. 4 shows a perspective sectional view of a coolant-collecting device according to an exemplary embodiment of the invention.

FIG. 4 shows a perspective sectional view of a coolant-collecting device 1 according to an exemplary embodiment of the invention. The coolant-collecting device 1 comprises two flexible coolant-collecting tubes 2, which extend parallel to the end surface of a coolant distribution system 10, also called cooling profile plate 9, and are connected to one another by a T-shaped connecting piece 3 having three tubular connecting elements 3a, 3b, 3c.

A first tubular connecting element 3a of the three tubular connecting elements 3a, 3b, 3c of the T-shaped connecting piece 3 is inserted in a coolant channel 4 of a battery cooling profile 5. This first tubular connecting element 3a comprises an annular groove, in which a sealing element 6, in this case an o-ring, is located.

The two flexible coolant-collecting tubes 2 are merged by the T-shaped connecting piece 3. For this purpose, the two flexible coolant-collecting tubes 2 are connected, by means of one tube clamp 8 each, also called crimp clamp or screw clamp, to the second and third tubular connecting elements 3b, 3c, respectively, of the T-shaped connecting piece 3.

Figure 5:
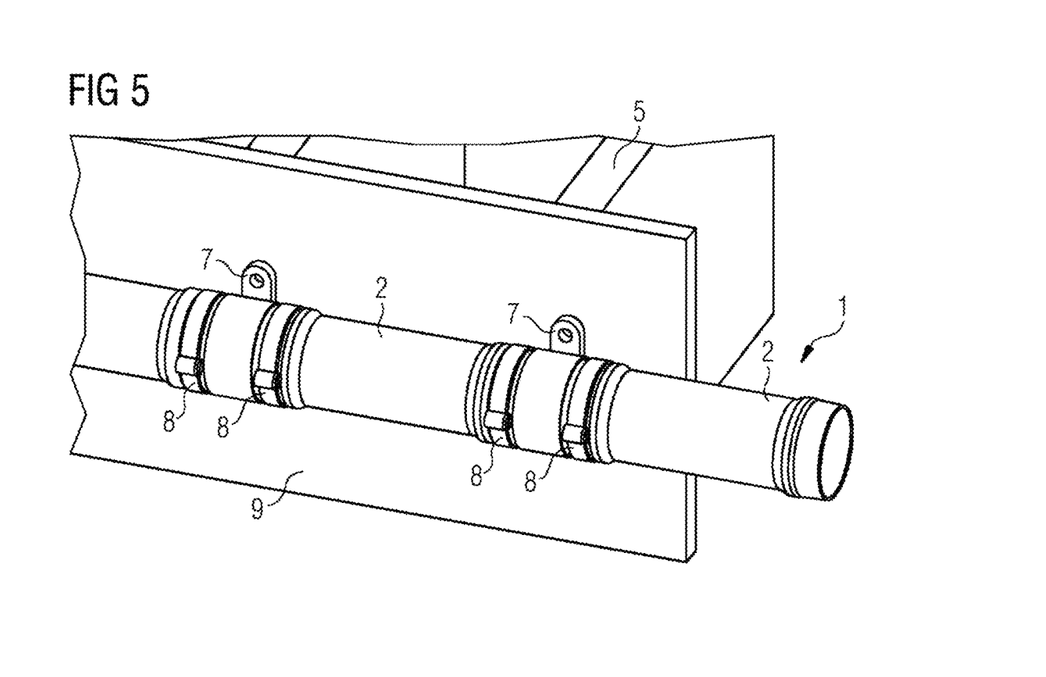
FIG. 5 shows a plan view of a coolant-collecting device according to an exemplary embodiment of the invention.

FIG. 5 shows a plan view of a coolant-collecting device 1 according to an exemplary embodiment of the invention. The coolant-collecting device 1 is provided with screw points 7, which can be screwed on the end surface of the battery coolant distribution system or the cooling profile plate 9. The screw points 7 are integrally connected to T-shaped connecting pieces 3 of the coolant-collecting device 1 and form tongue-shaped protrusions having screw holes. FIG. 5 also shows four tube clamps 8, of which one tube clamp 8 is arranged at each end of a flexible coolant-collecting tube 2 in order to fasten the respective end to a T-shaped connecting piece 3.

Figure 6:
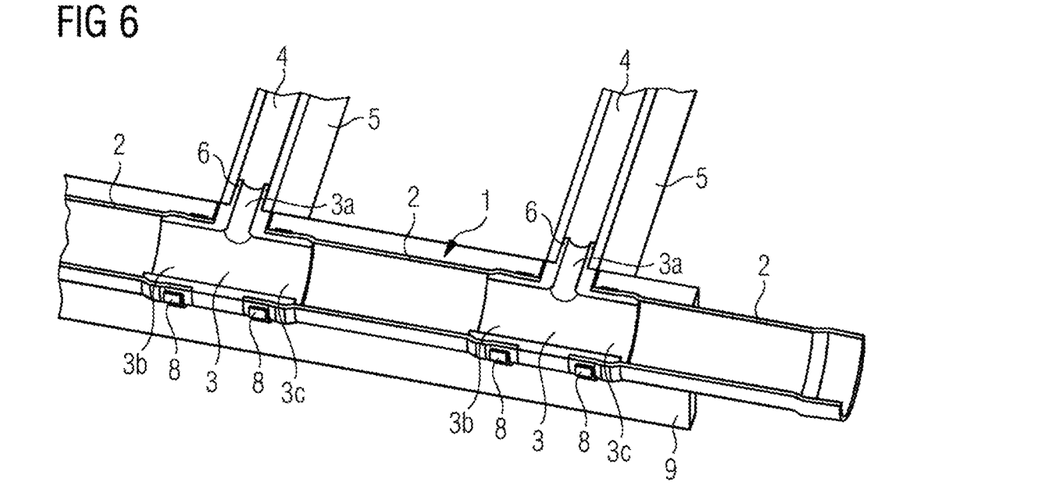
FIG. 6 shows a sectional view of the coolant-collecting device shown in FIG. 5 according to an exemplary embodiment of the invention.

FIG. 6 shows a sectional view of the coolant-collecting device 1 shown in FIG. 5 according to an exemplary embodiment of the invention. As already described in connection with the coolant-collecting device 1 shown in FIG. 4, the coolant-collecting device 1 shown in FIG. 6 comprises a plurality of flexible coolant-collecting tubes 2, which extend parallel to the end surface of a coolant distribution system or a cooling profile plate 9. The flexible coolant-collecting tubes 2 are merged by T-shaped connecting pieces 3 having three tubular connecting elements 3a, 3b, 3c. For fastening, the flexible coolant-collecting tubes 2 are connected to the T-shaped connecting pieces 3 by means of a tube clamp 8 in each case.

A first tubular connecting element 3a of the three tubular connecting elements 3a, 3b, 3c of the T-shaped connecting pieces 3 is inserted in each case in a coolant channel 4 of a battery cooling profile 5 extending perpendicularly to the cooling profile plate 9. This first tubular connecting element 3a comprises an annular groove, in which a sealing element 6, in this case an o-ring, is located. The second and third tubular connecting elements 3b, 3c of each T-shaped connecting piece 3 are connected to the flexible coolant-collecting tubes 2.

Figure 7:
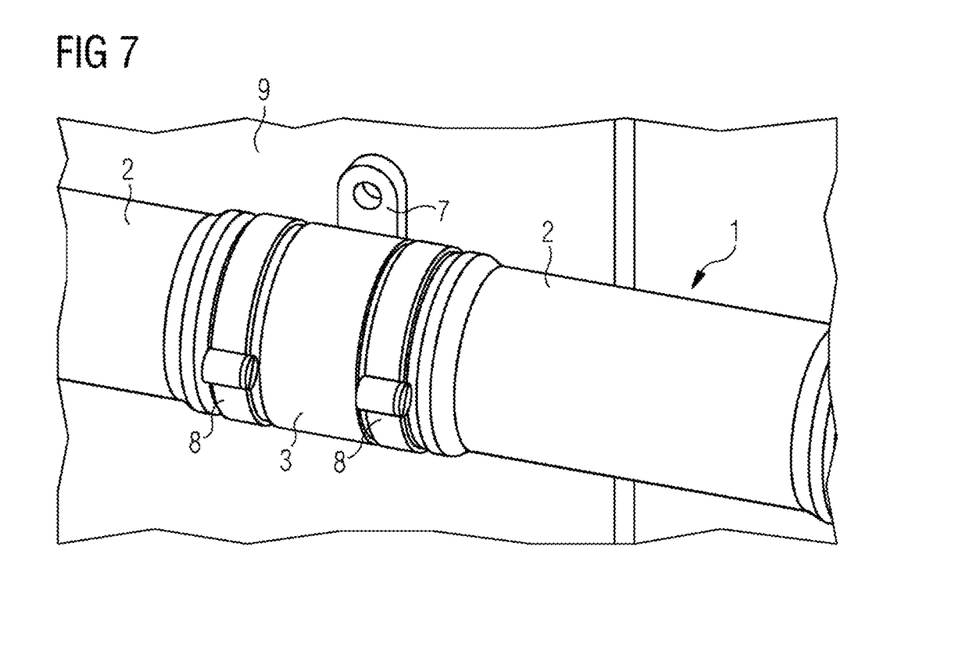
FIG. 7 shows a detailed plan view of the coolant-collecting device shown in FIG. 6.

FIG. 7 shows a detailed plan view of the coolant-collecting device 1 shown in FIG. 6. As already mentioned in connection with FIG. 6, the flexible coolant-collecting tubes 2 are connected, by means of one tube clamp 8 each, to the T-shaped connecting piece 3. A screw point 7 for fastening the T-shaped connecting piece 3 on the cooling profile plate 9 or end surface of the associated battery coolant distribution system (not shown) is also shown.

Figure 8:
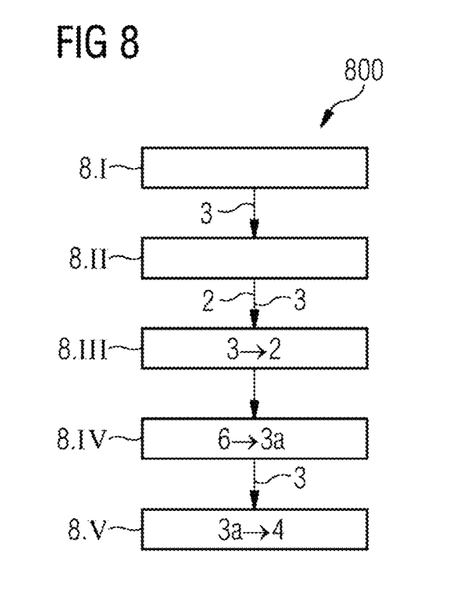
FIG. 8 shows a flowchart which illustrates a method for producing a battery coolant distribution system according to an exemplary embodiment of the invention.

FIG. 8 shows a flowchart 800 which illustrates a method for producing a battery coolant distribution system 10 according to an exemplary embodiment of the invention.

In step 8.I, a T-shaped connecting piece 3 having three tubular connecting elements 3a, 3b, 3c is formed. A first 3a of the three tubular connecting elements 3a, 3b, 3c, which is oriented perpendicularly to the other two tubular connecting elements 3b, 3c, is designed to be received in a coolant channel 4 of a battery cooling profile 5.

In step 8.II, two flexible coolant-collecting tubes 2 having a cross section compatible with a cross section of two opposite connecting elements 3b, 3c of the three tubular 17 connecting elements 3a, 3b, 3c are formed.

In step 8.III, the T-shaped connecting piece 3 is arranged between the flexible coolant-collecting tubes 2.

In step 8.IV, the first 3a of the three tubular connecting elements 3a, 3b, 3c of the T-shaped connecting piece 3 is provided with an annular groove on its outer peripheral surface and is provided with an o-ring in this annular groove as a sealing element 6.

Finally, in step 8.V the first 3a of the three tubular connecting elements 3a, 3b, 3c of the T-shaped connecting piece 3 is inserted into a coolant channel 4 of a battery coolant distribution system 10, which coolant channel runs in a battery cooling profile 5 (see FIG. 4).

A plurality of T-shaped connecting pieces 3 and flexible coolant-collecting tubes 2 are in this way joined to one another so that they form a serial chain-type arrangement.

The outer flexible coolant-collecting tubes 2, which are connected only at one end thereof to a T-shaped connecting piece 3, are connected directly to a connection hose 15 or feed hose or discharge hose by means of a quick coupling. This connection hose 15 is longer than in a conventional arrangement and, in contrast to the conventional arrangement (see FIG. 2), ends directly in a quick coupling at the end of the connection hose 15 or in a connection to an outer flexible coolant-collecting tube 2. Thus, the additional connection means 15a shown in FIG. 2 is dispensed with.

Figure 9:
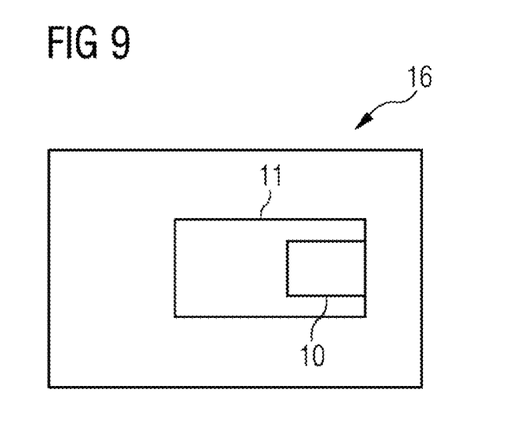
FIG. 9 shows a schematic illustration of a vehicle having a battery coolant distribution system according to an exemplary embodiment of the invention.

FIG. 9 shows a vehicle 16 having an electric vehicle battery 11, in particular a traction battery. The electric vehicle battery 11 comprises a battery coolant distribution system according to an exemplary embodiment of the invention.

Finally, it is noted again that the methods and apparatuses described above are merely preferred exemplary embodiments of the invention and that the invention can be varied by a person skilled in the art without leaving the scope of invention, insofar as said scope is specified by the claims. For the sake of completeness, IT is also noted that the use of the indefinite article "a" or "an" does not exclude the possibility that a plurality of the corresponding features can also be provided. Likewise, the term "unit" does not exclude the possibility that the unit consists of a plurality of components, which may also be spatially distributed.

The invention claimed is:

1. A battery coolant distribution system for a vehicle, the battery coolant distribution system comprising:
   a battery cooling profile having a coolant channel extending therein, and a cooling profile plate fixedly connected to said battery cooling profile;
   a coolant-collecting device having:
      at least two flexible coolant-collecting tubes;
      a T-shaped connecting piece with three tubular connecting elements;
      said T-shaped connecting piece being arranged between said flexible coolant-collecting tubes, and a first of said three tubular connecting elements, which is oriented perpendicularly to the other said tubular connecting elements, being configured to be received in said coolant channel of said battery cooling profile, said T-shaped connecting piece including a fastening unit for fastening said T-shaped connecting piece onto said cooling profile plate, and said fastening unit having a screw point for screwing said fastening unit to said cooling profile plate; and said flexible coolant-collecting tubes having a cross section compatible with a cross section of two opposite second and third connecting elements of said three tubular connecting elements and being connected to said second and third connecting elements; and said screw point of said fastening unit being integrally connected to a T-shaped connecting piece of said coolant-collecting device and being a tongue-shaped protrusion formed with a screw hole.

2. The battery coolant distribution system according to claim 1, wherein said coolant-collecting device comprises a sealing element for sealing between said first tubular connecting element and the coolant channel.

3. The battery coolant distribution system according to claim 2, wherein said sealing element comprises an O-ring.

4. The battery coolant distribution system according to claim 1, wherein said flexible coolant-collecting tubes are fastened to said T-shaped connecting piece by way of a releasable fastening unit.

5. The battery coolant distribution system according to claim 4, wherein said releasable fastening unit is a hose clamp.

6. The battery coolant distribution system according to claim 1, wherein said coolant-collecting device comprises:
   a plurality of T-shaped connecting pieces;
   at least three flexible coolant-collecting tubes connected in series to one another by way of said plurality of T-shaped connecting pieces.

7. The battery coolant distribution system according to claim 1, wherein said first tubular connecting element of said three tubular connecting elements of said T-shaped connecting piece of said coolant-collecting device is inserted into said coolant channel of said battery cooling profile.

8. The battery coolant distribution system according to claim 7, further comprising a connection line for connection to a cooler system, wherein said connection line is connected directly to an outer of said flexible coolant-collecting tubes.

9. The battery coolant distribution system as claimed in claim 7, wherein the direct connection is formed by a quick coupling between the outer flexible coolant-collecting tube and the connection line.

10. A method for producing a battery coolant distribution system, the method comprising:
   forming a T-shaped connecting piece having three tubular connecting elements with a first of the three tubular connecting elements, which is oriented perpendicularly to second and third tubular connecting elements of said three tubular connecting elements, being configured to be received in a coolant channel of a battery cooling profile having a cooling profile plate fixedly connected to the battery cooling profile;
   forming at least two flexible coolant-collecting tubes having a cross section compatible with a cross section of the second and third connecting elements of the three tubular connecting elements, wherein the T-shaped connecting piece includes a fastening unit for fastening the T-shaped connecting piece onto the cooling profile plate and the fastening unit includes a screw point for screwing the fastening unit to the cooling profile plate;
   wherein the screw point is integrally connected to a T-shaped connecting piece of the coolant-collecting device and forms a tongue-shaped protrusion with a screw hole;
   arranging the T-shaped connecting piece between the flexible coolant-collecting tubes;
   connecting the second and third connecting elements of the T-shaped connecting piece to the flexible coolant-collecting tubes; and
   inserting the first of the three tubular connecting elements of the T-shaped connecting piece into the coolant channel of the battery cooling profile.

11. A vehicle, comprising an electric battery and a battery coolant distribution system according to claim 1.

\* \* \* \* \*